(12) United States Patent
Tortora et al.

(10) Patent No.: US 9,292,003 B2
(45) Date of Patent: Mar. 22, 2016

(54) SET OF LUMINOUS DISPLAY HANDS FOR A PORTABLE OBJECT SUCH AS A WATCH OR A MEASURING INSTRUMENT

(71) Applicant: The Swatch Group Research and Development Ltd, Marin (CH)

(72) Inventors: Pierpasquale Tortora, Neuchâtel (CH); Cédric Faure, Cortaillod (CH); Simon Springer, Bern (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 14/688,586

(22) Filed: Apr. 16, 2015

(65) Prior Publication Data

US 2015/0346691 A1    Dec. 3, 2015

(30) Foreign Application Priority Data

May 27, 2014    (EP) .................................... 14170094

(51) Int. Cl.
*G04B 19/30* (2006.01)
*G01D 13/26* (2006.01)

(52) U.S. Cl.
CPC .............. *G04B 19/305* (2013.01); *G01D 13/26* (2013.01)

(58) Field of Classification Search
CPC ........ G04B 19/04; G04B 19/32; G04B 19/30; G04B 19/305; G01D 13/26; H05B 33/10
USPC ....................................................... 368/226
See application file for complete search history.

(56) References Cited

U.S. PATENT DOCUMENTS 2,072,079 A    3/1937    Childs
2,072,795 A    3/1937    Childs
(Continued)

FOREIGN PATENT DOCUMENTS

FR    2 393 273 A1    12/1978
GB    2 004 065 A    3/1979
(Continued)

OTHER PUBLICATIONS

European search report issued in application 14170036, completed Feb. 25, 2015.
(Continued)

*Primary Examiner* — Sean Kayes
(74) *Attorney, Agent, or Firm* — Oblon, McClelland, Maier & Neustadt, L.L.P

(57) ABSTRACT

Set of luminous display hands for a portable object which houses an electrical energy supply source, the set of luminous display hands including first and second superposed luminous display hands each provided with a hole for the passage of a drive arbour, the drive arbour of the second luminous display hand being arranged concentrically inside the drive arbour of the first hand with insertion of an insulating layer between the two drive arbours, the first and second luminous display hands respectively carrying a first and a second light source, the first pole of the first light source being electrically connected to a first terminal of the power supply source via the drive arbour of the first luminous display hand, the second pole of the first light source being connected to the first pole of the second light source via a contact piece, and the second pole of the second light source being connected to the second terminal of the power supply source via the drive arbour of the second luminous display hand.

20 Claims, 9 Drawing Sheets

(56) References Cited

U.S. PATENT DOCUMENTS

| | | | |
|---|---|---|---|
| 2,363,763 A | 11/1944 | Werts | |
| 3,079,748 A * | 3/1963 | Hultquist | G04B 19/30 368/226 |
| 4,215,647 A | 8/1980 | Fukasawa | |
| 4,993,005 A * | 2/1991 | Watanabe | G04B 19/305 368/226 |
| 4,995,022 A * | 2/1991 | Ikeda | G01D 13/26 368/226 |
| 5,623,456 A * | 4/1997 | Miyamoto | G04B 19/305 368/226 |
| 2006/0126443 A1 * | 6/2006 | Kuo | G04C 17/00 368/232 |

FOREIGN PATENT DOCUMENTS

| | | |
|---|---|---|
| GB | 2 233 478 A | 1/1991 |
| GB | 2 421 809 A | 7/2006 |
| JP | 56-7074 A | 1/1981 |
| JP | 56-7075 A | 1/1981 |
| KR | 10-2011-0048807 A | 5/2011 |
| WO | 97/28424 A1 | 8/1997 |

OTHER PUBLICATIONS

European search report issued in application 14170094, completed Mar. 2, 2015.

* cited by examiner

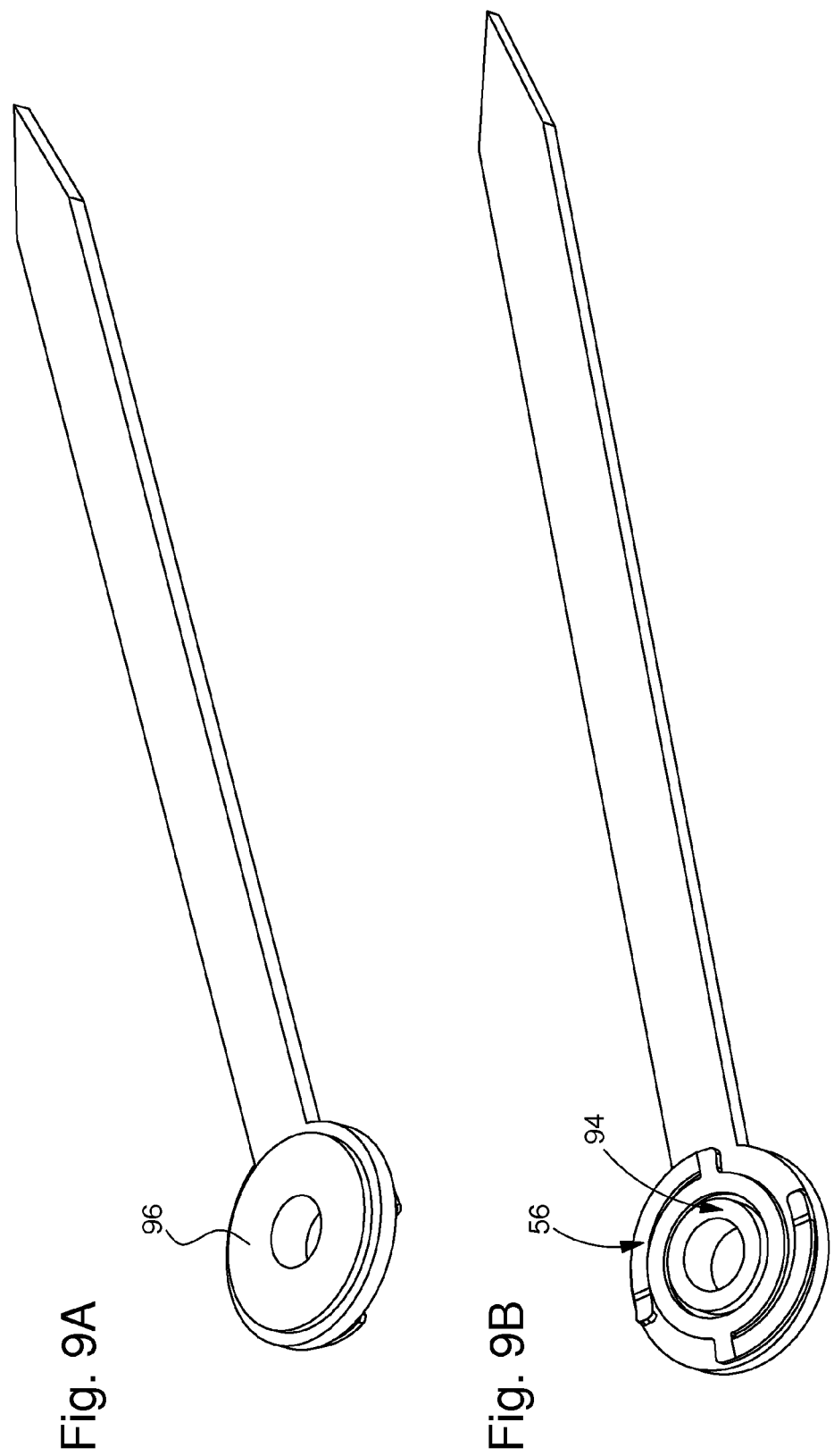

SET OF LUMINOUS DISPLAY HANDS FOR A PORTABLE OBJECT SUCH AS A WATCH OR A MEASURING INSTRUMENT

This application claims priority from European patent application 14170094.8 filed May 27, 2014, the entire disclosure of which is hereby incorporated herein by reference.

FIELD OF THE INVENTION

The present invention concerns a set of luminous display hands for a portable object. The present invention concerns, in particular, a set of luminous display hands for a timepiece such as a wristwatch or a measuring apparatus with an analogue display.

BACKGROUND OF THE INVENTION

Watch hands are manufactured with tight tolerances. The hole in the hand for the passage of the pipe is generally made with a precision of around a micrometre. This precision is necessary in order to ensure that the hand is correctly driven onto its arbour. Hands are generally made from a metal sheet with a thickness of no more than a few hundred micrometres. To reduce the thickness of the watch, the distance between the hands and the watch glass are usually no more than a millimetre, whereas the distance which separates two coaxial hands, for example the hour hand and the minute hand, is on the order of a fraction of a millimetre.

Watch hands evidently have a functional role, for example indicating the current time, but they also have a decorative role by greatly contributing to the aesthetic appearance of the watch to which they are fitted. To this end, the hands must meet strict criteria. A well known technique in the world of watchmaking permitting the hands to be seen in the dark consists in coating the surface of the hands oriented towards the user with a layer of phosphorescent material. One example of such a material is a non-radioactive photoluminescent pigment sold by the Japanese company Nemoto & Co. Ltd, under the registered trademark Super-Luminova®. This pigment may also be used to coat the hour symbols on the watch dial. In daytime, the layer of phosphorescent material absorbs light energy. This light energy is then released at night by the layer of phosphorescent material in the form of luminous radiation. This technique of illuminating the hands of a watch is quite convenient insofar as the layer of phosphorescent material operates in a completely passive manner and therefore does not require actuation of any mechanical or electrical device in order to function, nor does it require any energy to be taken from the watch. However, this technique of illuminating the hands of a watch also has some drawbacks, the first of which requiring mention is the fact that the layer of phosphorescent material must be pre-illuminated by a light source before it is able to transmit light energy. Likewise, the phenomenon of retransmitting light by phosphorescence is limited in time, so that the luminosity of the phosphorescent layer decreases gradually as it releases the light energy that it has stored. The appearance of the hands coated with a layer of phosphorescent material is not, therefore, constant. Finally, there is a limited range of phosphorescent materials available on the market, so that most watches in which such materials are used generally have the same appearance in the dark.

As a variant of the phosphorescent layer, it is possible to envisage using active illumination techniques in which discrete light sources are used to light the hands of a watch. By way of example, it is possible to integrate an ultraviolet light source in the watch, so that the radiation emitted excites the fluorescent material which coats the hands. However, this type of embodiment also has drawbacks. On the one hand, ultraviolet light sources, also known as black light sources, emit a certain amount of visible light, so that the user is likely to see a halo of light at the place where the light source is placed. On the other hand, given that the hands can move in relation to the ultraviolet light source, they do not always receive the same quantity of ultraviolet light, so that their luminosity may vary. A third drawback lies in the fact that the conversion efficiency between visible light and ultraviolet radiation is mediocre.

SUMMARY OF THE INVENTION

It is an object of the present invention to overcome the aforementioned drawbacks in addition to others, by providing a set of luminous display hands able to be illuminated on demand by the user, in a large variety of colours and observing the dimensional and aesthetic constraints to which these hands are subjected.

To this end, the present invention concerns a set of luminous display hands for a portable object which houses an electrical energy supply source, the set of luminous display hands including at least first and second superposed luminous display hands each provided with a hole for the passage of a drive arbour, the drive arbour of the second luminous display hand being arranged concentrically inside the drive arbour of the first hand with insertion of an insulating layer between the two drive arbours, the first and second luminous display hands respectively carrying a first and a second light source, the first and second light sources each including a first and a second pole, the first pole of the first light source being electrically connected to a first terminal of the power supply source via the drive arbour of the first luminous display hand, the second pole of the first light source being connected to the first pole of the second light source via a contact piece which ensures electrical continuity between the first and second luminous display hands, and the second pole of the second light source being connected to the second terminal of the power supply source via the drive arbour of the second luminous display hand.

As a result of these features, the present invention provides a set of concentrically mounted hands which each have a light source for their illumination. This remarkable result is achieved as a result of the fact that one of the poles of one of the light sources is connected to one of the poles of the other light source by means of the electrical contact between the two hands, which enables the drive arbours of the two hands to be used for the electrical connection of the light sources to the terminals of the power supply source. Further, because the hands are used for routing the electrical signal, there is obtained an extremely simple assembly, which is thus less expensive and more reliable.

BRIEF DESCRIPTION OF THE DRAWINGS

Other features and advantages of the present invention will appear more clearly upon reading the following detailed description of one embodiment of the invention, this example being given purely by way of non-limiting illustration with reference to the annexed drawing, in which:

FIGS. 9A and 9B are respectively top and bottom views of one luminous display hand according to the invention.

DETAILED DESCRIPTION OF ONE EMBODIMENT OF THE INVENTION

Figure 1:
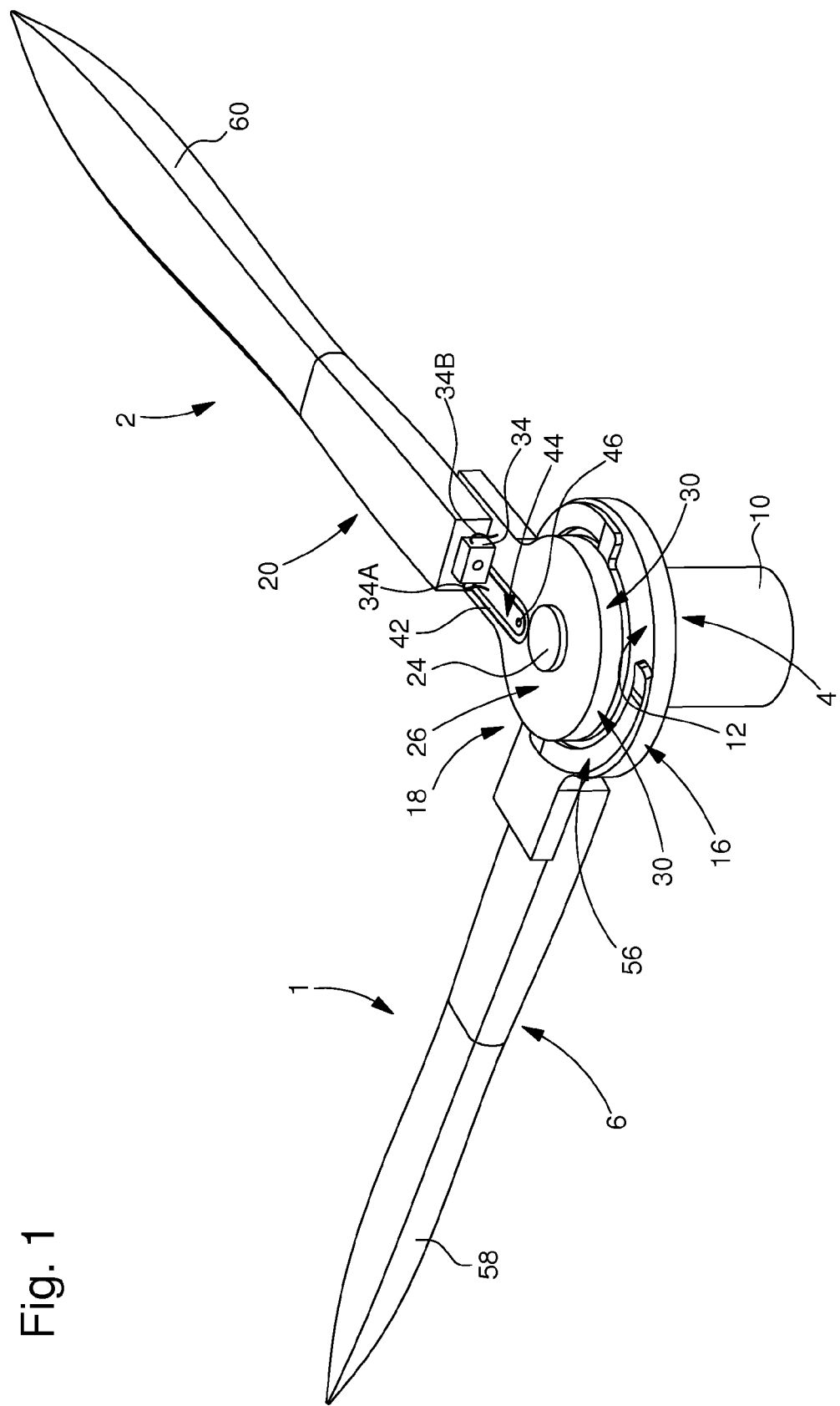
FIGS. 1 and 2 are respectively top and bottom views of the set of luminous display hands according to the invention in an assembled state.
Figure 2:
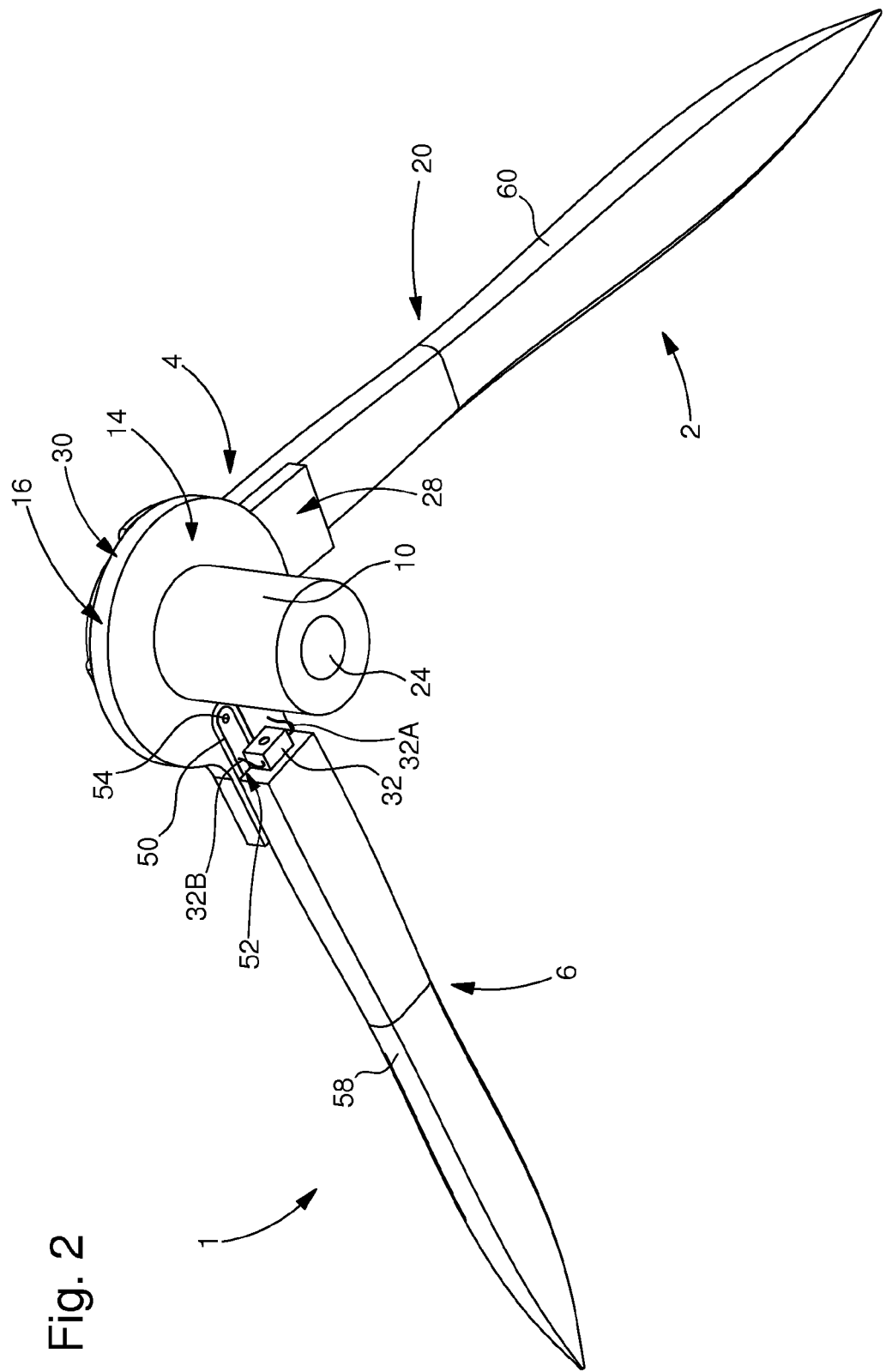
Figure 3:
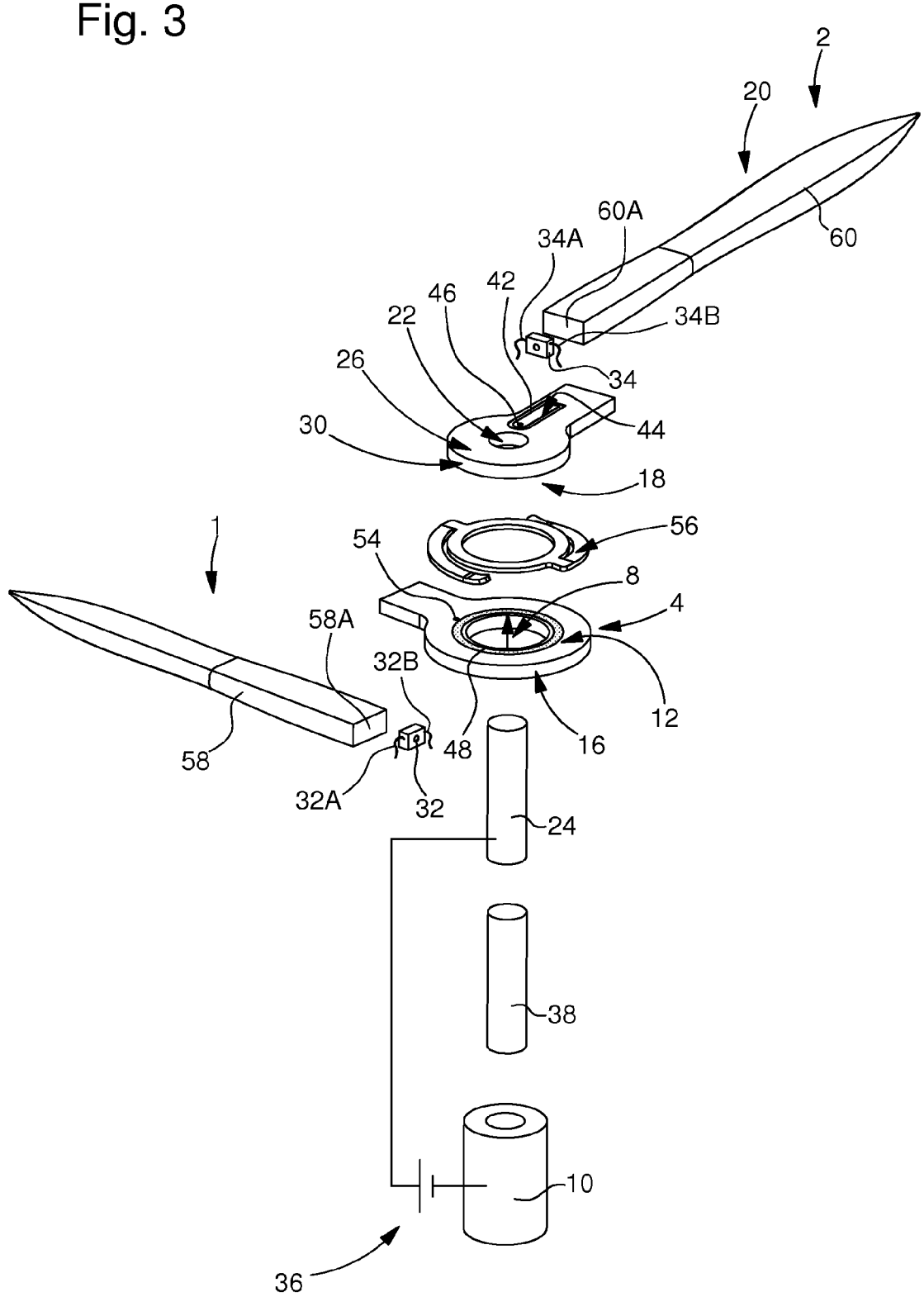
FIGS. 3 and 4 are respectively top and bottom views of the set of luminous display hands according to the invention in a disassembled state.
Figure 4:
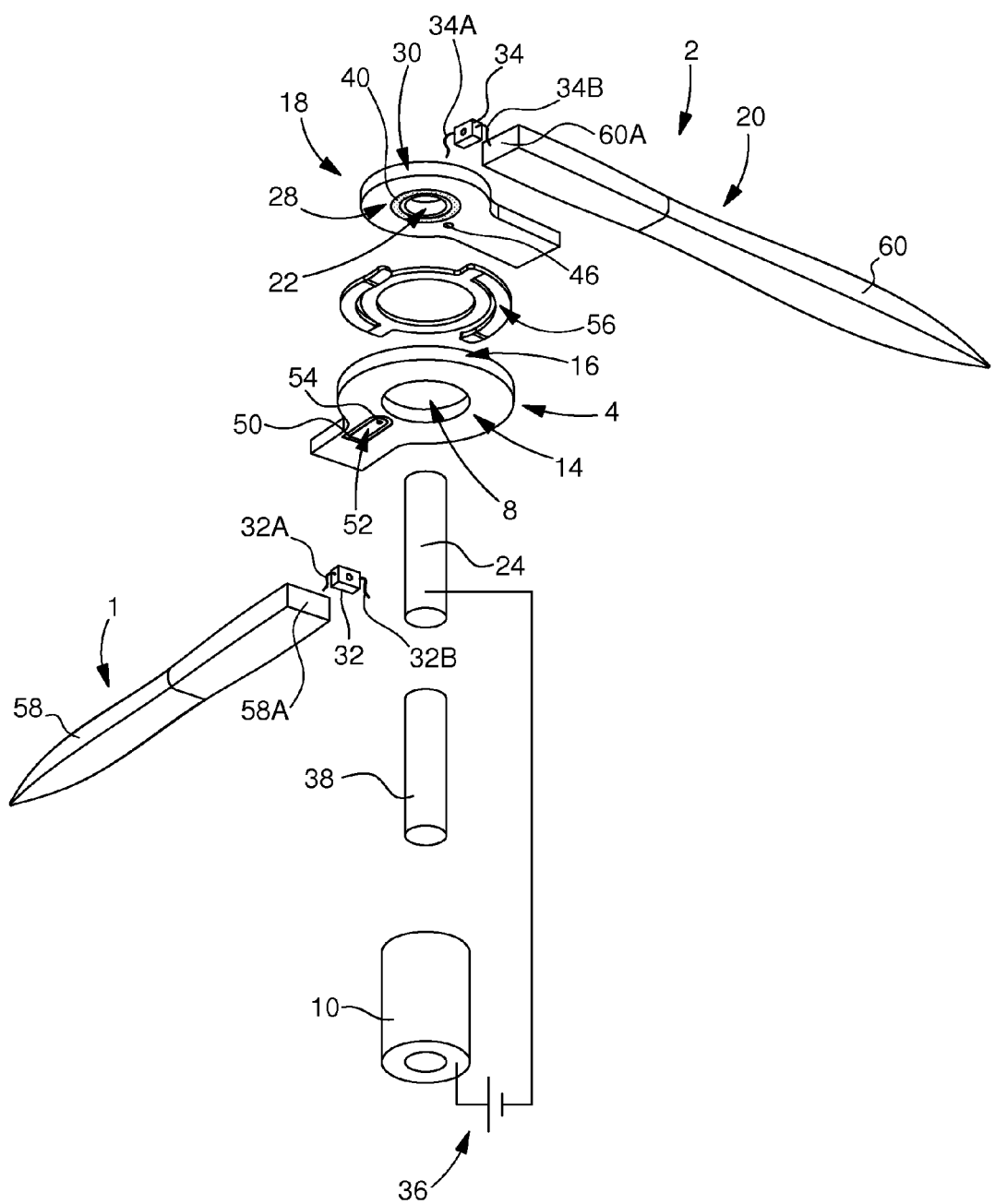
Figure 5:
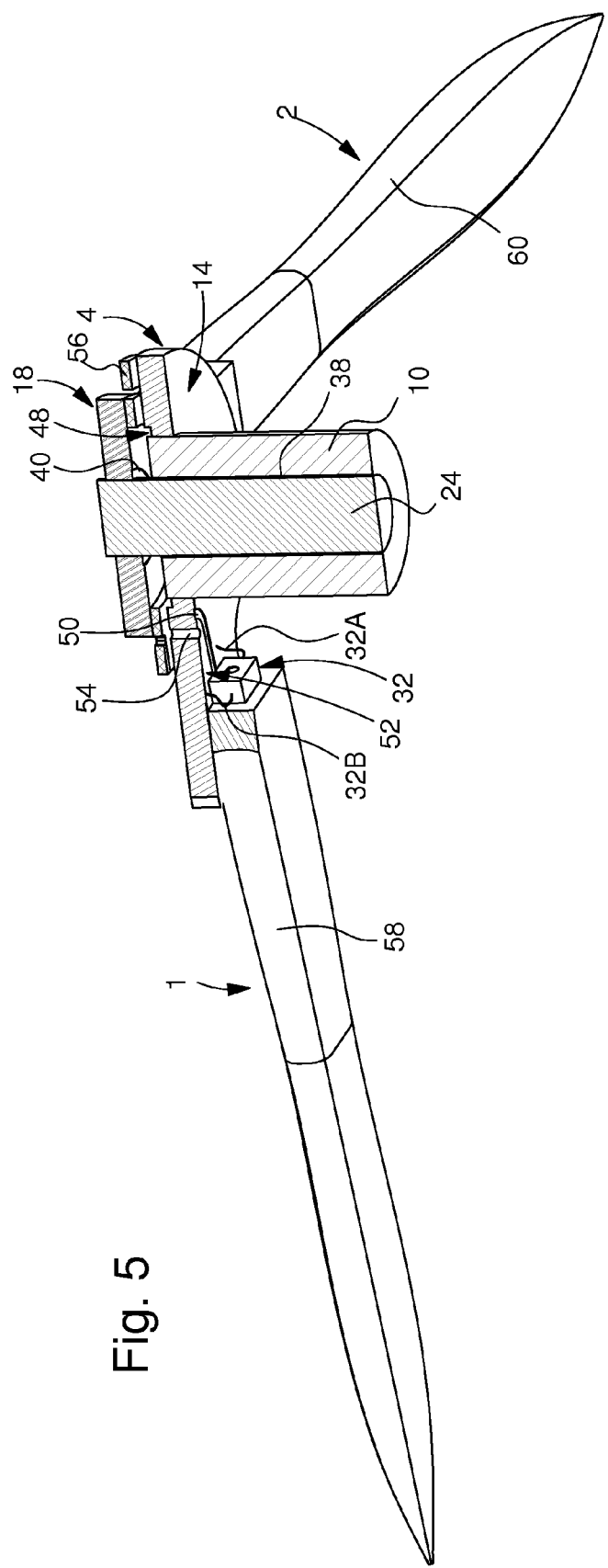
FIG. 5 is a large scale, cross-sectional view of the central hub of the set of luminous display hands according to the invention.

The present invention proceeds from the general inventive idea which consists in illuminating a display hand for a portable object, such as a wristwatch or a measuring instrument, by means of a point light source, preferably a light emitting diode. This luminous display hand has several advantages: its appearance does not deteriorate with the passing of time, and because there is a wide range of existing light emitting diodes, it is possible to personalise the appearance of the hand and therefore the appearance of the portable object to which it is fitted, making it possible to stand out from the competition. Further, according to another advantage of the invention, the light source is arranged on the hand for which it is used and not, for example, in the drive arbour of the hand, which considerably simplifies the design of such hands as well as the electrical connection thereof to the electrical energy source housed within the frame of the portable object.

In the example shown in FIGS. 1 to 5, the set of hands according to the invention includes a first and a second luminous display hand, respectively 1 and 2. The first luminous display hand 1 is formed of a first annular element 4 extended by a portion 6 which extends in a substantially rectilinear manner. The first annular element 4 has, at the centre thereof, a hole 8 for the passage of a drive arbour 10 of the first luminous display hand 1. First annular element 4 is provided with an upper surface portion 12 facing an observer, and with a lower surface portion 14 opposite upper surface portion 12. The upper 12 and lower 14 surface portions of first annular element 4 are connected to each other over the entire length of their perimeter by a lateral surface 16. According to a feature of the invention which will be described in more detail below, first annular element 4 is coated with a layer of an electrically conductive material on its upper 12 and lower 14 surface portions, and in hole 8 in which drive arbour 10 is engaged.

In a similar manner to the first luminous display hand 1, the second luminous display hand 2 is formed of a second annular element 18 extended by a portion 20 which extends in a substantially rectilinear manner. Second annular element 18 of second luminous display hand 2 has, at the centre thereof, a hole 22 for the passage of a drive arbour 24 arranged concentrically inside drive arbour 10 of first luminous display hand 1. Second annular element 18 is provided with an upper surface portion 26 facing an observer, and with a lower surface portion 28 opposite upper surface portion 26. The upper 26 and lower 28 surface portions of second annular element 18 are connected to each other over the entire length of their perimeter by a lateral surface 30. According to a feature of the invention which will be described in more detail below, second annular element 18 is also coated with a layer of an electrically conductive material on its upper 26 and lower 28 surface portions, and in hole 22 in which drive arbour 24 is engaged.

First luminous display hand 1 carries a first light source 32 and second luminous display hand 2 carries a second light source 34. First and second light sources 32 and 34 are point light sources such as light emitting diodes. First and second light sources 32 and 34 include first and second poles, respectively 32A, 32B and 34A, 34B, for the electrical connection thereof to an electrical energy supply source 36 housed inside a frame, for example of a wristwatch fitted with the set of luminous display hands 1, 2 according to the invention. The electrical energy supply source 36 may be either a cell or a rechargeable battery. Given that the light sources 32, 34 in question here typically have an electrical power consumption on the order of several tens to several hundred microamperes, it is even possible to envisage powering said source by means of a watch barrel or a generator or a dynamo actuated by the user, for example by means of a push button, provided in the portable object. The advantage of such a solution lies in the fact that it avoids any energy storage solution relying on physicochemical phenomena. It will also be understood that, even when using light sources 1, 2 whose power consumption is as low as several tens of microamperes, the lighting obtained is already equivalent to that of the phosphorescent materials usually used to coat luminous display hands.

The first pole 32A of the first light source 32 is connected to the power supply source 36 via drive arbour 10 of first hand 1, and the second pole 32B of the first light source 32 is connected to the first pole 34A of the second light source 34 in a manner that will be described in detail below. Second pole 34B of second light source 34 is connected to power supply source 36 via drive arbour 24 of the second luminous display hand 2. To this end, the drive arbours 10 and 24 of the first and second luminous display hands 1 and 2 must be electrically conductive and must be electrically insulated from each other by the insertion of an insulating layer 38.

As mentioned above, the first and second annular elements 4 and 18 are coated on their upper and lower surface portions with a layer of electrically conductive material. More specifically, drive arbour 24 is driven into a metallized hole 22 arranged in second annular element 18. Consequently, upper surface portion 26 of second annular element 18 is brought to the same electrical potential as drive arbour 24. Conversely (see FIG. 4), a continuous trench 40, arranged in lower surface portion 28 of second annular element 18 and made electrically insulating by the local removal of electrically conductive material, surrounds drive arbour 24, so that lower surface portion 28 is electrically insulated from drive arbour 24. Likewise (see FIGS. 1 and 3), a continuous trench 42, which is closed on itself and which is made insulating in the same manner as continuous trench 40, is arranged in upper surface portion 26 of second annular element 18 so as to create an island 44 electrically insulated from the rest of upper surface portion 26. A metallized through hole or via 46 made in the thickness of second annular element 18 makes it possible to electrically connect to each other island 44 arranged in upper surface portion 26 and lower surface portion 28. It will be noted that trenches 40, 42 are typically obtained by photolithographic etching. Other material removal techniques, such as mechanical ablation of material or laser ablation may, however, be envisaged.

Likewise, drive arbour 10 is driven into a metallized hole 8 in first annular element 4. Consequently, the lower surface portion 14 of first annular element 4 is brought to the same electrical potential as drive arbour 10. On the contrary (see FIG. 3), a continuous trench 48, arranged in upper surface portion 12 of first annular element 4 and made electrically insulating by the local removal of electrically conductive material, surrounds drive arbour 10, so that upper surface portion 12 is electrically insulated from drive arbour 10. Likewise (see FIGS. 2 and 4), a continuous trench 50, which is closed on itself and which is made insulating in the same manner as continuous trench 48, is arranged in lower surface portion 14 of first annular element 4 so as to create an island 52 electrically insulated from the rest of lower surface portion 14. A metallized through hole 54 or via made in the thickness of first annular element 4 makes it possible to electrically connect between them island 52 arranged in lower surface portion 14 and upper surface portion 12.

Finally, lower surface portion 28 of second annular element 18 is placed in contact with upper surface portion 12 of first annular element 4 via an electrically conductive and mechanically elastic contact piece 56 disposed between the first and second luminous display hands 1 and 2 and centred on drive arbour 10. Island 44 arranged in upper surface portion 26 is thus electrically connected to upper surface portion 12 of first annular element 4, this upper surface portion 12 being in turn electrically connected to island 52 arranged in lower surface portion 14 of first annular element 4.

According to the invention, the first pole 32A of first light source 32 is electrically connected to a first terminal of power supply source 36 via drive arbour 10 of first luminous display hand 1. To this end, first pole 32A is connected, for example by a wire bonding technique, to lower surface portion 14 of first annular element 4. Second pole 32B of first light source 32 is connected to first pole 34A of second light source 34 via contact piece 56, which ensures electrical continuity between the first and second luminous display hands 1 and 2. To achieve this, second pole 32B of first light source 32 is connected to island 52 arranged in lower surface portion 14 of first annular element 4. By means of metallized via 54, pierced in the thickness of first annular element 4, island 52 is electrically connected to upper surface portion 12 of first annular element 4, this upper surface portion 12 being in turn electrically connected, by means of contact piece 56, to lower surface portion 28 of second annular element 18. Lower surface portion 28 of second annular element 18 is in turn connected to island 44 arranged in upper surface portion 26 of second annular element 18 by means of metallized via 46. Finally, first pole 34A of second light source 34 is electrically connected to island 44 arranged in upper surface portion 26 of second annular element 18. Second pole 34B of second light source 34 is connected to the second terminal of power supply source 36 via drive arbour 24. To achieve this, second pole 34B is electrically connected to upper surface portion 26 of second annular element 18.

In the embodiment shown in FIGS. 1 to 5, the first and second luminous display hands 1, 2 are each formed of a printed circuit board used to form the first and second annular elements, respectively 4 and 18, and of a light guide, respectively 58 and 60. The printed circuit boards are metallised on the top and bottom, but not on the edge. Light guide 58 is fixed under first annular element 4 to form first luminous display hand 1 and light guide 60 is fixed onto second annular element 18 to form second luminous display hand 2. This embodiment is preferred to prevent light guides 58 and 60 from hindering each other during rotation of luminous display hands 1 and 2. The first and second light sources 32 and 34 are fixed, for example by adhesive bonding, to an entry face 58A, 60A of light guides 58 and 60. The light produced by light sources 32, 34 propagates inside light guides 58, 60 by optical coupling.

Figure 6:
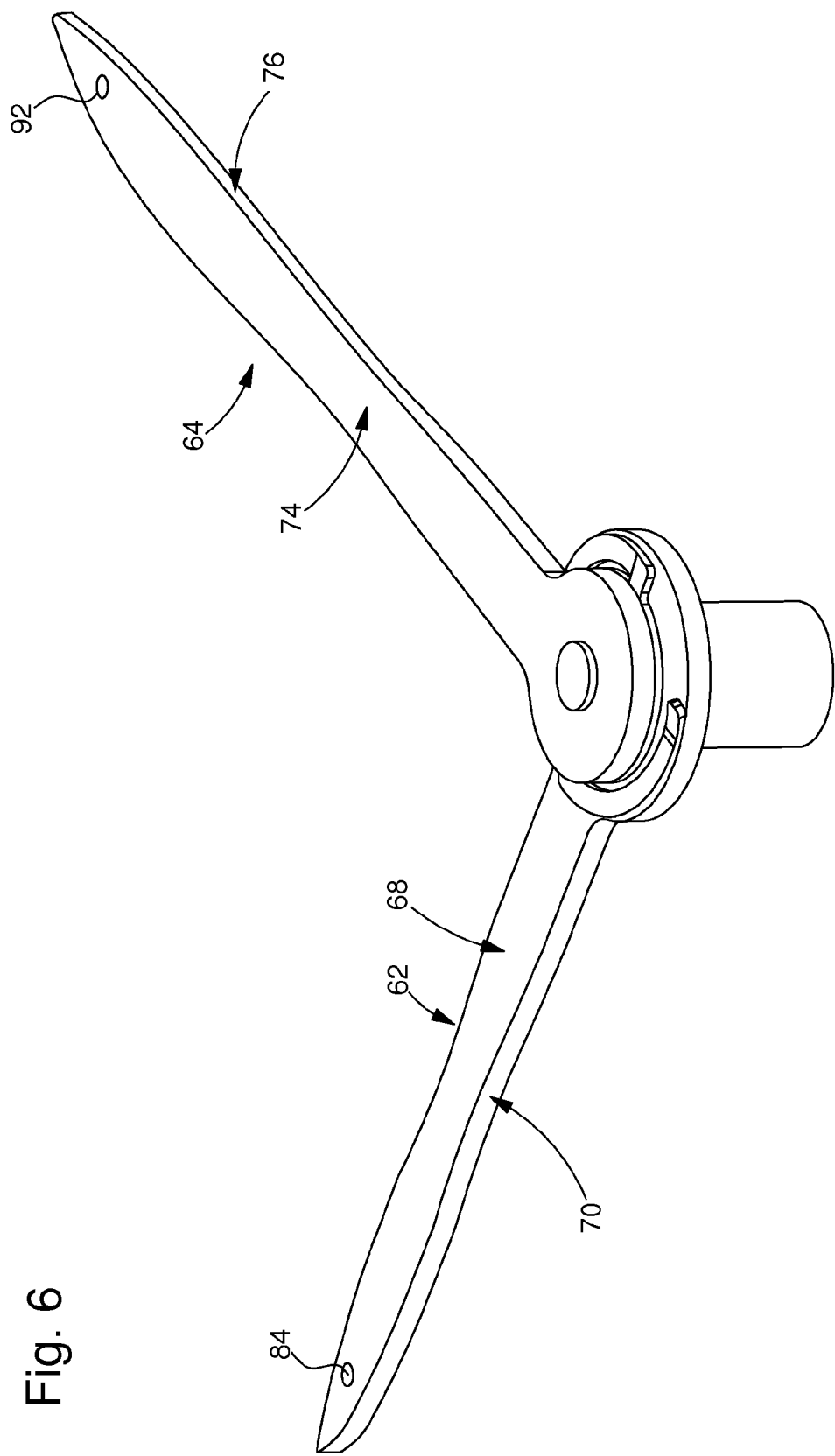
FIGS. 6 and 7 are respectively top and bottom views of a variant embodiment of the set of luminous display hands according to the invention.
Figure 7:
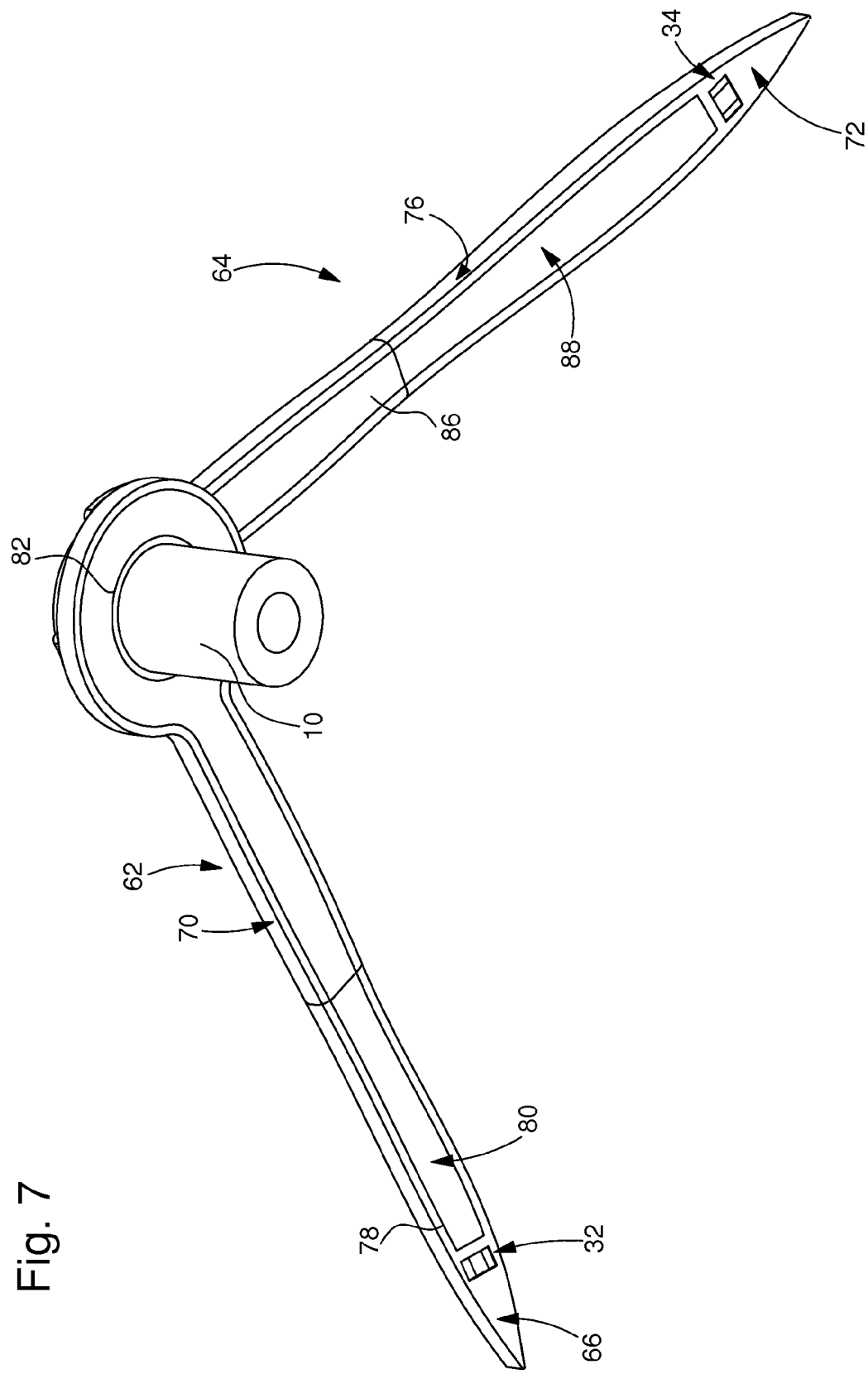
Figure 8:
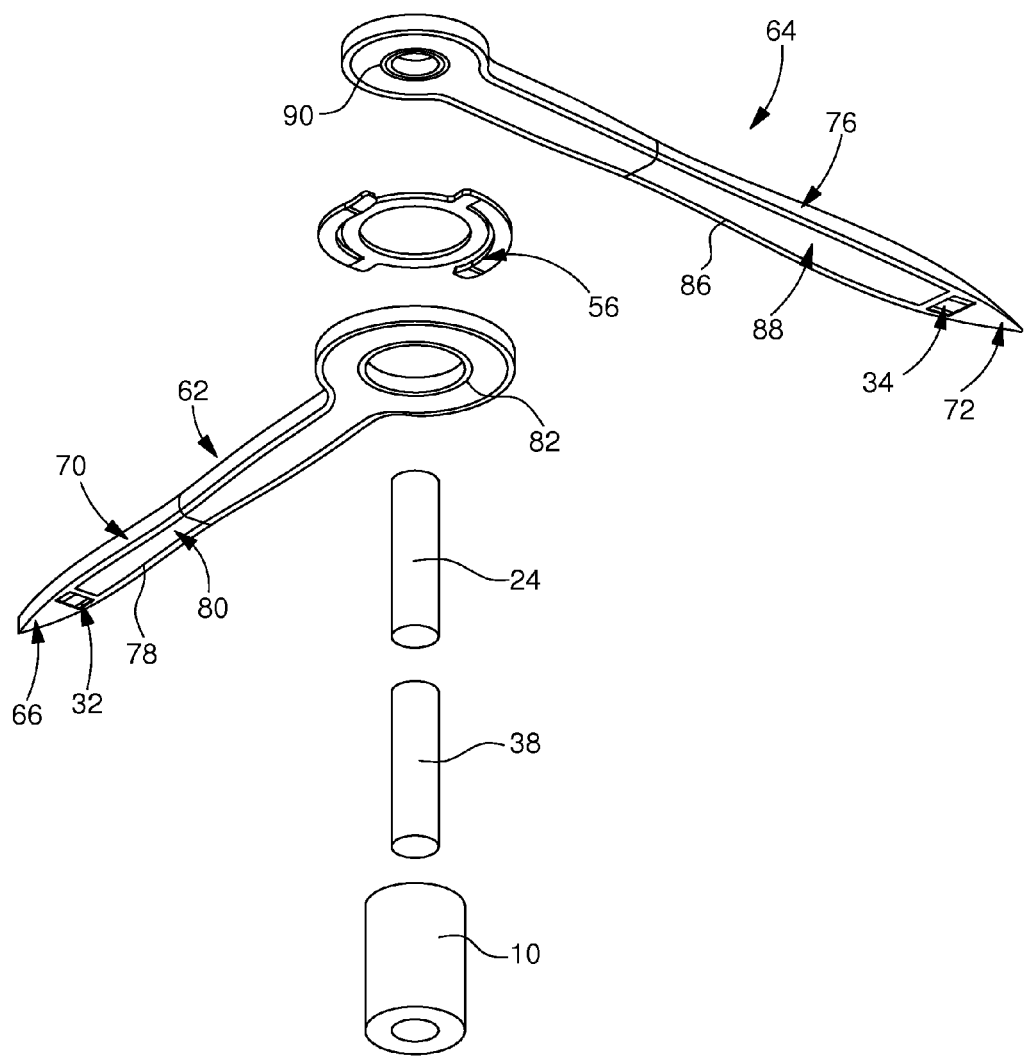
FIG. 8 is a bottom view of the set of luminous display hands of FIGS. 6 and 7 in a disassembled state.

In another embodiment, also illustrated in FIGS. 6 to 8, the first and second luminous display hands 62, 64 are made in one-piece in a transparent, semi-transparent or translucent material such as plastic, quartz, silica, sapphire, ruby or other material. The first luminous display hand 62 includes a lower surface portion 66 and an upper surface portion 68 connected to lower surface portion 66 by a lateral surface 70. Likewise, second luminous display hand 64 includes a lower surface portion 72 and an upper surface portion 74 connected to lower surface portion 74 by a lateral surface 76. The first and second luminous display hands 62, 64 are metallized on all surfaces.

A continuous trench 78, arranged in lower surface portion 66 of first luminous display hand 62 and made electrically insulating by the local removal of electrically conductive material, makes it possible to create an island 80, electrically insulated from the rest of lower surface portion 66. The remaining lower surface portion 66 is electrically connected to upper surface portion 68 via lateral surface 70 of first luminous display hand 62. A continuous trench 82, arranged in island 80 and made electrically insulating by the local removal of electrically conductive material, surrounds drive arbour 10, so that island 80 is electrically insulated from drive arbour 10. Light source 32 is fixed under the surface of luminous display hand 62 towards the free end of the hand. A hole 84, made in proximity to the end of hand 62, allows the light produced by light source 32 to escape upwards towards the observer.

In an identical manner, a continuous trench 86, arranged in lower surface portion 72 of second luminous display hand 64 and made electrically insulating by the local removal of electrically conductive material, makes it possible to create an island 88, electrically insulated from the rest of lower surface portion 72. The remaining lower surface portion 72 is electrically connected to upper surface portion 74 via lateral surface 76 of second luminous display hand 64. A continuous trench 90, arranged in island 88 and made electrically insulating by the local removal of electrically conductive material, surrounds drive arbour 24, so that island 88 is electrically insulated from drive arbour 24. Light source 32 is fixed under the surface of luminous display hand 62 towards the free end of the hand. A hole 92, made in proximity to the end of hand 64, allows the light produced by light source 34 to escape upwards towards the observer.

The arrangement described above advantageously removes the need for vias.

It goes without saying that this invention is not limited to the embodiments that have just been described and that various simple alterations and variants can be envisaged by those skilled in the art without departing from the scope of the invention as defined by the annexed claims. Thus, as illustrated in FIGS. 9A and 9B, which are respectively top and bottom views of a luminous display hand according to the invention, it is possible to envisage driving the hand onto its drive arbour via an electrically conductive tube portion 94 provided with a collar 96 by means of which tube portion 94 bears on the hand. Tube portion 94 is driven into the hole in the hand, and the drive arbour is driven into tube portion 94. According to another advantageous variant of the invention, light sources 32, 34 are fixed onto the upper surface of luminous display hands 62, 64. As the two luminous display hands are no longer the same length, there is no risk of light sources 32, 34 colliding with each other.

LIST OF PARTS

First luminous display hand 1
Second luminous display hand 2
Annular element 4
Substantially rectilinearly extending portion 6
Hole 8
Drive arbour 10
Upper surface portion 12
Lower surface portion 14
Lateral surface 16

Annular element 18
Substantially rectilinearly extending portion 20
Hole 22
Drive arbour 24
Upper surface portion 26
Lower surface portion 28
Lateral surface 30
First light source 32
First and second poles 32A, 32B
Second light source 34
First and second poles 34A, 34B
Electrical energy supply source 36
Insulating layer 38
Continuous trench 40
Continuous trench 42
Island 44
Metallized via 46
Continuous trench 48
Continuous trench 50
Island 52
Metallized via 54
Contact piece 56
Light guide 58, 60
First luminous display hand 62
Second luminous display hand 64
Lower surface portion 66
Upper surface portion 68
Lateral surface 70
Lower surface portion 72
Upper surface portion 74
Lateral surface 76
Continuous trench 78
Island 80
Continuous trench 82
Hole 84
Continuous trench 86
Island 88
Continuous trench 90
Hole 92
Tube portion 94
Collar 96

What is claimed is:

1. A set of luminous display hands for a portable object which houses an electrical energy supply source, wherein the set of luminous display hands includes at least first and second superposed luminous display hands each provided with a hole for the passage of a drive arbour, wherein the drive arbour of the second luminous display hand is arranged concentrically inside the drive arbour of the first hand with insertion of an insulating layer between the two drive arbours, wherein the first and second luminous display hands respectively carry a first and a second light source, wherein the first and second light sources each includes a first and a second pole, wherein the first pole of the first light source is electrically connected to a first terminal of the power supply source via the drive arbour of the first luminous display hand, wherein the second pole of the first light source is connected to the first pole of the second light source via a contact piece which ensures electrical continuity between the first and second luminous display hands, and wherein the second pole of the second light source is connected to the second terminal of the power supply source via the drive arbour of the second luminous display hand.

2. The set of luminous display hands according to claim 1, wherein the contact piece is centred on the drive arbour.

3. The set of luminous display hands according to claim 2, wherein each of the first and second luminous display hands is respectively formed of a first and a second annular element extended by a portion which extends from a proximal end to a distal end, wherein the first and second annular elements respectively each has at the centre thereof a hole for the passage of the drive arbour of the first and second luminous display hands respectively, wherein the first and second annular elements each is provided with an upper surface portion facing an observer, and a lower surface portion opposite the upper surface portion, wherein the upper and lower surface portions of the first and second annular elements are connected to each other by a lateral surface, wherein the upper and lower surface portions and the hole in the first and second annular elements are coated with a layer of electrically conductive material.

4. The set of luminous display hands according to claim 3, wherein the upper surface portion of the second annular element is brought to the same electrical potential as the drive arbour of the second luminous display hand, wherein an electrically insulating continuous trench, arranged in the lower surface portion of the second annular element, surrounds the drive arbour, so as to electrically insulate the lower surface portion from the drive arbour, wherein an electrically insulating continuous trench is arranged in the upper surface portion of the second annular element, so as to create an island electrically insulated from the rest of the upper surface portion, wherein a metallized through hole made in the thickness of the second annular element makes it possible to electrically connect to each other the island arranged in the upper surface portion and the lower surface portion, wherein the lower surface portion of the first annular element is brought to the same electrical potential as the drive arbour of the first luminous display hand, wherein an electrically insulating continuous trench, arranged in the upper surface portion of the first annular element, surrounds the drive arbour so as to electrically insulate the upper surface portion from the drive arbour, wherein an electrically insulating continuous trench is arranged in the lower surface portion of the first annular element, so as to create an island electrically insulated from the rest of the lower surface portion, wherein a metallized through hole pierced in the thickness of the first annular element makes it possible to electrically connect to each other the island arranged in the lower surface portion and the upper surface portion, and wherein the lower surface portion of the second annular element is placed in electrical contact with the upper surface portion of the first annular element via an elastic electrically conductive contact piece disposed between the first and second luminous display hands.

5. The set of luminous display hands according to claim 4, wherein the first pole of the first light source is electrically connected to a first terminal of the power supply source via the lower surface portion of the first annular element and the drive arbour of the first luminous display hand, wherein the second pole of the first light source is connected to the first pole of the second light source which is in turn electrically connected to the island arranged in the upper surface portion of the second annular element via the contact piece which ensures electrical continuity between the first and second luminous display hands, and wherein the second pole of the second light source is electrically connected to a second terminal of the power supply source via the upper surface portion of the second annular element and the drive arbour of the second luminous display hand.

6. The set of luminous display hands according to claim 2, wherein the first and second luminous display hands are made in one piece, wherein the first luminous display hand includes a lower surface portion and an upper surface portion connected to the lower surface portion by a lateral surface, and wherein the second luminous display hand includes a lower surface portion and an upper surface portion connected to the lower surface portion by a lateral surface, wherein the first and second luminous display hands are metallized on all surfaces.

7. The set of luminous display hands according to claim 6, wherein the first and second luminous display hands are made of a transparent, semi-transparent or translucent material selected from the group formed by plastic, quartz, silica, sapphire and ruby.

8. The set of luminous display hands according to claim 7, wherein, for each of the first and second luminous display hands, a continuous electrically insulating trench is arranged in the lower surface portion of the first luminous display hand and second luminous display hand respectively, so as to create an island electrically insulated from the rest of the lower surface portion, wherein the lower surface portion remains electrically connected to the upper surface portion via the lateral surface of the first luminous display hand or second luminous display hand respectively, and wherein a continuous electrically insulating trench arranged in the island surrounds the drive arbour of the first luminous display hand, respectively the drive arbour of the second luminous display hand, so that the island is electrically insulated from the drive arbour.

9. The set of luminous display hands according to claim 6, wherein, for each of the first and second luminous display hands, a continuous electrically insulating trench is arranged in the lower surface portion of the first luminous display hand and second luminous display hand respectively, so as to create an island electrically insulated from the rest of the lower surface portion, wherein the lower surface portion remains electrically connected to the upper surface portion via the lateral surface of the first luminous display hand or second luminous display hand respectively, and wherein a continuous electrically insulating trench arranged in the island surrounds the drive arbour of the first luminous display hand, respectively the drive arbour of the second luminous display hand, so that the island is electrically insulated from the drive arbour.

10. The set of luminous display hands according to claim 1, wherein each of the first and second luminous display hands is respectively formed of a first and a second annular element extended by a portion which extends from a proximal end to a distal end, wherein the first and second annular elements respectively each has at the centre thereof a hole for the passage of the drive arbour of the first and second luminous display hands respectively, wherein the first and second annular elements each is provided with an upper surface portion facing an observer, and a lower surface portion opposite the upper surface portion, wherein the upper and lower surface portions of the first and second annular elements are connected to each other by a lateral surface, wherein the upper and lower surface portions and the hole in the first and second annular elements are coated with a layer of electrically conductive material.

11. The set of luminous display hands according to claim 10, wherein the upper surface portion of the second annular element is brought to the same electrical potential as the drive arbour of the second luminous display hand, wherein an electrically insulating continuous trench, arranged in the lower surface portion of the second annular element, surrounds the drive arbour, so as to electrically insulate the lower surface portion from the drive arbour, wherein an electrically insulating continuous trench is arranged in the upper surface portion of the second annular element, so as to create an island electrically insulated from the rest of the upper surface portion, wherein a metallized through hole made in the thickness of the second annular element makes it possible to electrically connect to each other the island arranged in the upper surface portion and the lower surface portion, wherein the lower surface portion of the first annular element is brought to the same electrical potential as the drive arbour of the first luminous display hand, wherein an electrically insulating continuous trench, arranged in the upper surface portion of the first annular element, surrounds the drive arbour so as to electrically insulate the upper surface portion from the drive arbour, wherein an electrically insulating continuous trench is arranged in the lower surface portion of the first annular element, so as to create an island electrically insulated from the rest of the lower surface portion, wherein a metallized through hole pierced in the thickness of the first annular element makes it possible to electrically connect to each other the island arranged in the lower surface portion and the upper surface portion, and wherein the lower surface portion of the second annular element is placed in electrical contact with the upper surface portion of the first annular element via an elastic electrically conductive contact piece disposed between the first and second luminous display hands.

12. The set of luminous display hands according to claim 11, wherein the first pole of the first light source is electrically connected to a first terminal of the power supply source via the lower surface portion of the first annular element and the drive arbour of the first luminous display hand, wherein the second pole of the first light source is connected to the first pole of the second light source which is in turn electrically connected to the island arranged in the upper surface portion of the second annular element via the contact piece which ensures electrical continuity between the first and second luminous display hands, and wherein the second pole of the second light source is electrically connected to a second terminal of the power supply source via the upper surface portion of the second annular element and the drive arbour of the second luminous display hand.

13. The set of luminous display hands according to of claim 1, wherein the first and second luminous display hands are each formed of a printed circuit board, used to form the first and second annular elements, and of a light guide.

14. The set of luminous display hands according to claim 13, wherein the printed circuit boards are metallized on the top and bottom, but not on the edge, and wherein the light guide is fixed under the first annular element to form the first luminous display hand, whereas the light guide is fixed onto the second annular element to form the second luminous display hand, wherein the first and second light sources are fixed onto an entry face of the light guides.

15. The set of luminous display hands according to claim 1, wherein the first and second luminous display hands are made in one piece, wherein the first luminous display hand includes a lower surface portion and an upper surface portion connected to the lower surface portion by a lateral surface, and wherein the second luminous display hand includes a lower surface portion and an upper surface portion connected to the lower surface portion by a lateral surface, wherein the first and second luminous display hands are metallized on all surfaces.

16. The set of luminous display hands according to claim 15, wherein the first and second light sources are fixed to the respective free ends of the first and second luminous display hands.

17. The set of luminous display hands according to claim 15, wherein the first and second light sources are fixed under the surface of the first and second luminous display hands and wherein a hole made in proximity respectively to the end of the first luminous display hand or the second luminous display hand, allows the light produced by the light source to escape upwards towards the observer.

18. The set of luminous display hands according to claim 15, wherein the first and second luminous display hands are made of a transparent, semi-transparent or translucent material selected from the group formed by plastic, quartz, silica, sapphire and ruby.

19. The set of luminous display hands according to claim 18, wherein, for each of the first and second luminous display hands, a continuous electrically insulating trench is arranged in the lower surface portion of the first luminous display hand and second luminous display hand respectively, so as to create an island electrically insulated from the rest of the lower surface portion, wherein the lower surface portion remains electrically connected to the upper surface portion via the lateral surface of the first luminous display hand or second luminous display hand respectively, and wherein a continuous electrically insulating trench arranged in the island surrounds the drive arbour of the first luminous display hand, respectively the drive arbour of the second luminous display hand, so that the island is electrically insulated from the drive arbour.

20. The set of luminous display hands according to claim 15, wherein, for each of the first and second luminous display hands, a continuous electrically insulating trench is arranged in the lower surface portion of the first luminous display hand and second luminous display hand respectively, so as to create an island electrically insulated from the rest of the lower surface portion, wherein the lower surface portion remains electrically connected to the upper surface portion via the lateral surface of the first luminous display hand or second luminous display hand respectively, and wherein a continuous electrically insulating trench arranged in the island surrounds the drive arbour of the first luminous display hand, respectively the drive arbour of the second luminous display hand, so that the island is electrically insulated from the drive arbour.

* * * * *